United States Patent [19]

Lyons

[11] Patent Number: 4,545,402

[45] Date of Patent: Oct. 8, 1985

[54] PRESSURE-REGULATING VALVE WITH A FORCE-FEEDBACK

[75] Inventor: Michael D. Lyons, Lexington, Ky.

[73] Assignee: American Standard Inc., Lexington, Ky.

[21] Appl. No.: 599,405

[22] Filed: Apr. 12, 1984

[51] Int. Cl.[4] ............................................. G05D 16/06
[52] U.S. Cl. ..................................... 137/495; 91/434; 137/116.5
[58] Field of Search ............... 137/116.5, 495; 91/368, 91/370, 372, 380, 382, 433, 434; 251/14

[56] References Cited

U.S. PATENT DOCUMENTS

| | | | |
|---|---|---|---|
| 3,246,579 | 4/1966 | Kellogg | 91/434 X |
| 3,292,499 | 12/1966 | Duffy | 91/382 X |
| 3,298,659 | 1/1967 | Cupedo | 251/14 |
| 3,370,827 | 2/1968 | Stehlin | 251/14 |

Primary Examiner—Robert G. Nilson
Attorney, Agent, or Firm—G. E. Hawranko

[57] ABSTRACT

A pressure-regulating valve having a force-feedback arrangement for indicating the fluid delivery, has a force cam rotatable along with an actuator member, shaft arrangement which controls the fluid delivery. At least one cam slot is formed in the force cam at an angle to the axis of the force cam. An annular ring is fixed within the valve housing in a coaxially surrounding relation to the force cam. At least one guide slot is formed on the annular ring parallel to the axis of the annular ring and adjacent the cam slot formed on the force cam. A follower pin extends between the adjacent cam and guide slots and is axially movable under the influence of a cam force exerted upon rotation of the force cam. A feedback piston is movable within a piston chamber located adjacent the force cam. The feedback piston contacts the follower pin which is a function of the delivered fluid value. The piston force is exerted in a direction opposite movement of the follower pin resulting from rotation of the force cam.

9 Claims, 3 Drawing Figures

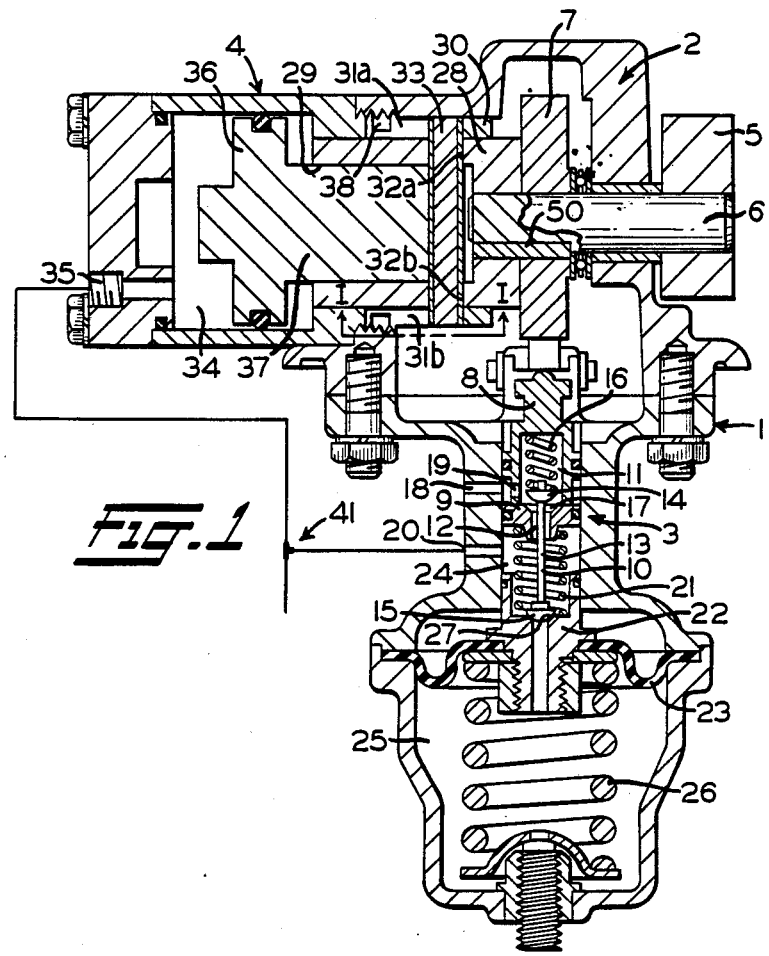
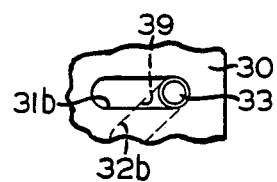
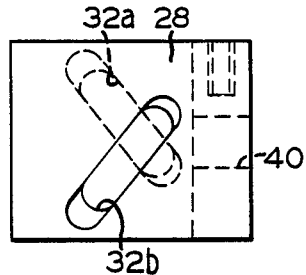

PRESSURE-REGULATING VALVE WITH A FORCE-FEEDBACK

BACKGROUND OF THE INVENTION

This invention relates to a pressure-regulating valve having a force-feedback arrangement. More specifically, this invention relates to a pressure-regulating valve which requires accurate pressure delivery according to the setting of the handle or pedal which controls the device and the conditions of the system. Typical pressure-regulating valves which have employed a force-feedback feature have used a torsion spring to provide an indication of the fluid pressure being delivered. This approach, however, has the disadvantage of being a simulated indication and not an actual reading of the handle position versus output pressure. Such a simulated indication cannot respond to a break in the pressure line or to any other system failure. Such use of a torsion spring also has the disadvantage of only applying to a pressure-regulating valve whereby a generally linear relationship exists between the output pressure and the handle position.

SUMMARY OF THE INVENTION

It is, therefore, an object of the invention to provide a pressure-regulating valve having a force-feedback feature which can accurately respond to changes in the fluid pressure system.

It is a further object of the invention to provide a force-feedback feature which can be used on a pressure-regulating valve having either a linear or a nonlinear relationship between the lever position and the output pressure.

Briefly, the invention consists of a valve housing having a valve segment, an actuator segment, and a feedback segment. The actuator segment can consist of a handle, pedal, or other operating mechanism secured to a shaft and whereby the shaft extends into the valve housing. A cam or other actuator is mounted on the shaft within the actuator portion and can exert a force on a valve body which is in the valve segment. The position of the cam on the valve body can determine the valve position which controls the amount of fluid pressure that flows between an input port and an output port, or between an output port and an exhaust port. Connected to the shaft is a force cam having a hollow bore portion and two angled pin slots oppositely arranged around the bore. A follower pin is axially movable within guide slots formed in the feedback segment around the external circumference of the force cam. As the handle is moved to rotate the shaft, the force cam is also rotated. The follower pin is guided within the guide slots which prevent the follower pin from rotating with the force cam. Since the follower pin cannot rotate with the force cam, it must move axially along the guide slots under the influence of the angled slot of the force cam as it rotates. To provide a resistance force to the movement of the follower pin along the guide slot, a piston bears against the follower pin. The amount of force applied by the piston is dependent on the fluid pressure that is in a piston chamber. The fluid pressure acting on the piston can be from a local or remote source and such fluid pressure enters through a feedback port. The force applied by the piston on the follower pin is then converted to a torque on the handle by the angled slot of the force cam.

BRIEF DESCRIPTION OF THE DRAWINGS

FIG. 1 is a view shown in partial section, of a pressure-regulating valve with a force-feedback function constructed in accordance with the invention.

FIG. 2 is a view of a pin slot arrangement taken along lines I—I of FIG. 1.

FIG. 3 is a view of the force cam constructed in accordance with the invention.

DESCRIPTION AND OPERATION

As seen in FIG. 1, the pressure-regulating valve with the force-feedback function, consists of a valve housing 1 having three interrelated segments; an actuator segment 2, a valve segment 3, and a feedback segment 4.

An actuator member 5 is secured to a shaft 6 which extends within the actuator segment 2 of the valve housing 1. The actuator member 5 is shown as a handle but can also be a pedal or some other device used by the operator to set the pressure-regulating valve to the desired fluid pressure delivery. Secured to the portion of the shaft 6 extending within the actuator segment 2, is an actuator cam 7. The actuator cam 7 is cammed to provide for the varying levels of fluid pressure delivery necessary for pressure-regulating valves where a wide range of operating pressure is desired.

The actuator cam 7 contacts a top portion of a first valve body 8 which extends partially within the actuator segment 2. Such actuator cam 7, valve body 8 contact results in the movement of the first valve body 8 within the valve segment 2, thus determining the operating characteristics of the pressure-regulating valve.

A valve plunger 10, disposed partially within a hollow body portion 11 of the first valve body 8, extends through a first valve opening 12 formed in a valve disk 9. The valve plunger 10 has a plunger stem 13 which connects a first valve stop 14 and a second valve stop 15. A first valve spring 16 exerts force on the valve plunger 10 and urges the valve plunger 10 to move in a direction whereby the first valve stop 14 contacts a first valve seat 17, thus closing the input valve 14, 17. The input valve 14, 17 is in communication with a fluid pressure source (not shown) through an inlet port 18 and a valve inlet 19 formed in the first valve body 8. Fluid pressure flows through the open end of the valve 14, 17, as shown in FIG. 1, through an outlet port 20 and to the fluid pressure controlled device.

As shown in FIG. 1, the first valve body 8 is in a downward position due to the forces exerted by the actuator member 5, actuator cam 7 arrangement. In the shown position, the first valve body 8 acts upon a second valve spring 21, compressing the second valve spring 21 against a second valve body 22. The second valve body 22 is connected by a diaphragm 23 to the valve housing 1 and separates an output chamber 24 from an exhaust chamber 25. A third valve spring 26 is disposed in the exhaust chamber 25. The third valve spring 26 contacts the second valve body 22 and urges the second valve body 22 and diaphragm 23 in a direction toward the first valve body 8. Due to the connection between the first valve stop 14 and a second valve stop 15, the downward position of the first valve body 8 corresponds to a closed position of exhaust valve 15, 27. The exhaust valve 15, 27 is formed by the second valve stop 15 and a second valve seat 27 formed on the second valve body 22. Absent the force of the actuator cam 7, which urges the first valve body 8 in a downward direction, the second valve spring 21 will urge the first valve body 8 to an upward position. The upward position of the first valve body 8 corresponds to a closed condition of the inlet valve 14, 17 and an open condition of the outlet valve 15, 27. A more detailed explanation of the relationship between actuator cam 7 and the first valve body 8, relative to the condition of the input and output valves, will be described hereinafter in further detail.

Connected to the shaft 6, adjacent the actuator cam 7, is a force cam 28. The force cam 28 is cup-shaped, having a cam bore 29 formed therein. The force cam 28 extends between the actuator segment 2 and the feedback segment 4 and serves to interconnect the actuator segment 2 to the feedback segment 4 such that, their respective operations are mutually dependent. An annular ring 30 is secured within the valve housing 1 between the feedback segment 4 and the actuator segment 2. The annular ring 30 coaxially surrounds at least a portion of the force cam 28 such that, the force cam 28 slidingly rotates within the annular ring 30 as the actuator member 5 is operated. Two guide slots 31a, b are formed on the annular ring 30 in diametrically opposed relation to one another and are formed in a parallel running direction to one another along the longitudinal axis of the shaft 6. Two cam slots 32a, b are formed in the force cam 28 in diametrically opposed relation to one another such that the cam slots 32a and 32b are angularly disposed relative to the axis of the force cam 28 thus establishing a slot pitch on the circumference of the force cam 28. The force cam 28 fits within the annular ring 30 such that, the guide slots 31a, b and the cam slots 32a, b are partially aligned. A follower pin 33 is inserted through the aligned portion of the guide slots 31a, b and cam slots 32a, b. In this manner, the follower pin 33 extends through the fixed annular ring 30, force cam 28, and the cam bore 29. The follower pin 33 can move only in the axial direction as it rides within the angularly formed guide slots 31a, b and is restrained from rotating within the force cam 28 by the axially aligned guide slots 31a, b.

Formed within the feedback segment 4 of the valve housing 1 and adjacent the force cam 28 is a piston chamber 34. A feedback port 35 allows for introduction to the piston chamber 34 of the output fluid pressure which is to be compared with the position of the actuator member 5, such output fluid pressure hereinafter to be referred to as a feedback pressure and to be communicated to the piston chamber 34 by a feedback line 41 connecting the output port 20 to the control device (not shown) and the feedback port 35. A piston 36 is axially movable in a first direction within the piston chamber 34 under the influence of the feedback pressure. A piston extension 37, formed as an extending part of the piston 36, slidably fits within the cam bore 29 and extends within the cam bore 29 such that, a pressing contact is formed between the piston 36, piston extension 37, and the follower pin 33.

An annular cam guide 38, formed within the valve housing 1, adjacent the piston chamber 34, assures a smooth, noncocking rotational movement of the force cam 28 as the actuator member 5 is operated.

As seen in FIG. 2, the guide slots 31a, b and the cam slots 32a, b align such that, a pin opening 39 is created through the annular ring 30 and the force cam 28 at diametrically opposing points along their respective circumferences. The pin opening 39 is essentially pear-shaped whereby the arcuate portion corresponds in size to the diameter of the follower pin 33, thus ensuring a secure fit between the follower pin 33 and the pin opening 39.

As shown in FIG. 3, the cam slots 32a, b are formed diametrically opposite one another around the circumference of the force cam 28 in an angular manner relative to the force cam axis. The shaft opening 40 is keyed to receive shaft 6 in the manner ensuring coincident rotational movement between the actuator member 5, shaft 6, and force cam 28. The angle between the two cam slots 32a, b can be selected to provide differing force characteristics exerted on the follower pin 33 by rotation of the force cam 28. If the angle between the two cam slots 32a, b is increased or decreased, while the feedback force exerted by the piston 36 is held constant, the operating characteristics of the pressure-regulating valve can be varied.

In operation, the pressure-regulating valve is set to the desired fluid pressure delivery by the operation of the actuator member 5 which, for example, will be referred to as an actuator handle 5. Movement of the actuator handle 5 causes rotational movement of the shaft 6. The actuator cam 7 is fixedly-secured to the shaft 6 such that, as the shaft 6 rotates the actuator cam 7 follows along therewith. Upon initial movement of the actuator handle 5, the actuator cam 7 contacts the first valve body 8, moving the first valve body 8 downward, compressing the second valve spring 21 against the second valve body 22. Initially, the second valve body 22 is prevented from moving downward because of the higher spring constant of the third valve spring 26. As the first valve body 8 initially moves downward, the valve plunger 10 also moves downward until the second valve stop 15 seats on the second valve seat 27, closing the outlet valve between the output chamber 24 and the exhaust chamber 25. Simultaneous to the second valve stop 15 seating on the second valve seat 27, the first valve stop 14 unseats from the first valve seat 17, thus opening the inlet valve 14, 17. The first valve body 8 can then be moved to a position determined by the actuator cam 7, such that the first valve inlet 19 can lap over a portion of the inlet port 18 and restrict the flow to the inlet valve 14, 17 accordingly.

Fluid pressure can then flow from the fluid pressure source (not shown) through the pressure-regulating valve to the fluid-pressure-operated device in an amount according to the positioning of the first valve body 8, second valve body 22, and the plunger 10, as determined by the position of the actuator handle 5. Such delivered fluid pressure will also contact the second valve body 22 and can compress the third valve spring 26 allowing the second valve body 22 and diaphragm 23 to move downward. The spring constant of the third valve spring 26 determines the regulating effect of the diaphragm 23 and second valve body 22. If the fluid pressure increases beyond the value set by the actuator handle 5, the outlet valve will open to exhaust some of the fluid pressure to atmosphere. To shut off the fluid pressure delivery, the actuator handle 5 is moved to where the actuator cam 7 comes away from the first valve body 8. The second valve spring 21 then urges the first valve body 8 upward and the first valve spring 16 urges the plunger 10 downward, thus seating the first valve stop 14 on the first valve seat 17 and unseating the second valve seat 15 from the second valve seat 27.

In addition to moving the actuator cam 7, operation of the actuator handle 5 also rotates force cam 28 by way of the key-connection 50 between the force cam 28 and the shaft 6 on which the actuator handle 5 operates. When the actuator handle 5 is in the "off" position corresponding to no fluid pressure delivery through the pressure-regulating valve, the follower pin 33 resides in the position shown in FIGS. 1 and 2. Such an "off" position of the follower pin 33 requires that the follower pin 33 rest at one end of both the guide slots 31a, b and cam slots 32a, b, thereby allowing for travel along the full length of both elliptically-shaped guide and cam slots 31a, b, 32a, b.

Upon initially moving the actuator handle 5, the force cam 28 begins to rotate. Since the follower pin 33 is restrained from rotational movement because of the guide slots 31a, b being formed along the longitudinal axis, the rotational movement of the force cam 28 forces the follower pin 33 axially along the guide slots 31a. Rotation of the force cam 28 effectively moves the position of the pin opening 39 along the respective cam slot 32a, b and guide slot 31a, b and thereby moves the position of the follower pin 33 along therewith.

In opposition to the positioning of the follower pin 33, caused by the operation of the actuator handle 5, a piston force is exerted on the follower pin 33. The piston force is a function of the fluid pressure value delivered by the pressure-regulating valve. In order to transmit a resistive force, which is a measure of the delivered fluid pressure, a feedback line (not shown) is connected to a feedback port 35. The feedback line can connect either local fluid pressure or any remote fluid pressure to the feedback segment 4 of the valve housing 1.

Such delivered fluid pressure is fed back through the feedback port 35 to the piston chamber 34 where such fluid pressure can act on the piston 36. As the delivered fluid pressure urges the piston 36 in a direction toward the follower pin 33, the piston extension 37 slidably moves within the cam bore 29 and contacts the follower pin 33, exerting a force in opposition to the movement of the follower pin 33, caused by operation of the actuator handle 5.

In this manner, it can be appreciated that the operator of the actuator handle 5 experiences a positive "feel" for the amount of fluid pressure being delivered through the pressure-regulating valve. Any deviation from the expected handle resistance can immediately be recognized and compensation made.

Though the above discussion has presented a pressure-regulating valve having a force-feedback arrangement whereby the regulating valve portion is controlled by an actuator cam, it can be appreciated that the force-feedback arrangement embodying the invention can be used on other types of operator-controlled regulating valves as well. As an example, a pilot-operated valve could be used in place of the actuator cam to operate the regulating valve portion. Further modifications may also be made without departing from the scope of the invention as detailed in the appended claims. For example, the angle of the cam slots 32a, b can be varied to either assist or resist in returning the handle to the zero position. Additionally, the cam slots 32a, b can be formed with profiled ends to allow for varying performance characteristics at either extreme of handle travel. Still another modification would be to use the force-feedback piston in conjunction with other known handle return means thus providing somewhat of a preconditioning to the handle operation.

I claim:

1. A valve having a force-feedback indicating fluid delivery of said valve, said valve comprising:
   (a) a valve housing;
   (b) an operable actuator member secured to a rotatable shaft extending partially within said valve housing;
   (c) valve means disposed within said valve housing for controlling the delivery of such fluid according to said actuator member operation;
   (d) a force cam connected to said shaft for rotational movement therewith;
   (e) at least one cam slot formed on a portion of said force cam, said at least one cam slot formed angularly relative to the axis of said force cam;
   (f) a nonrotatable annular ring fixedly disposed in said valve housing, said annular ring coaxially surrounding at least a portion of said force cam;
   (g) at least one guide slot formed on said annular ring in parallel relation to the axis of said annular ring, said at least one guide slot being disposed adjacent said at least one cam slot;
   (h) a follower pin extending between said at least one guide slot and said at least one cam slot, said follower pin being movable in an axial direction by a cam force exerted upon rotation of said force cam; and
   (i) a feedback piston movable within a piston chamber disposed adjacent said force cam, said feedback piston contacting said follower pin and exerting a piston force on said follower pin which is a function of such delivered fluid pressure, such piston force being exerted in a direction opposite such movement of said follower pin resulting from rotation of said force cam; and
   (j) feedback means connected between said piston chamber and said valve means for communicating such delivered fluid pressure to said piston chamber.

2. A valve, as set forth in claim 1, wherein said at least one cam slot comprises two cam slots formed in diametrically opposed relation to one another on said force cam, and said at least one guide slot comprises two guide slots formed in diametrically opposing relation to one another on said annular ring, said follower pin extending between said two guide slots and said two cam slots.

3. A valve, as set forth in claim 2, wherein said force cam has a hollow portion formed therein such that, said follower pin extends through said hollow portion.

4. A valve, as set forth in claim 3, wherein said feedback piston extends into said hollow portion and contacts said follower pin therein.

5. A valve, as set forth in claim 1, wherein said valve means is a regulating valve operable to a plurality of fluid delivery settings according to said actuator member operation.

6. A valve, as set forth in claim 1, wherein said angularly formed at least one cam slot can be formed at one of a plurality of angles relative to the axis of said force cam, such cam slot angle being selectable to achieve a desired relationship between such rotation of said force cam and such movement of said follower pin.

7. A valve, as set forth in claim 6, wherein such selectable cam slot angle is at least 30° relative to the axis of said force cam.

8. A valve, as set forth in claim 1, further comprising a valve cam means connected to said shaft for contacting said valve means and translating said actuator member operation to a fluid delivery through said valve means.

9. A valve, as set forth in claim 8, wherein said valve cam means is formed as a portion of said force cam.

* * * * *